(12) United States Patent
Joergensen

(10) Patent No.: US 12,739,347 B2
(45) Date of Patent: Sep. 15, 2026

(54) VIDEO SURVEILLANCE SYSTEM, COMPUTER-IMPLEMENTED VIDEO MANAGEMENT PROCESS, AND NON-TRANSITORY COMPUTER READABLE STORAGE MEDIUM

(71) Applicant: Milestone Systems A/S, Brøndby (DK)

(72) Inventor: Dennis Schou Joergensen, Brøndby (DK)

(73) Assignee: Milestone Systems A/S, Brøndby (DK)

(*) Notice: Subject to any disclaimer, the term of this patent is extended or adjusted under 35 U.S.C. 154(b) by 0 days.

(21) Appl. No.: 18/151,138

(22) Filed: Jan. 6, 2023

(65) Prior Publication Data

US 2023/0142015 A1 May 11, 2023

Related U.S. Application Data

(63) Continuation-in-part of application No. 17/520,430, filed on Nov. 5, 2021.

(30) Foreign Application Priority Data

Nov. 11, 2020 (EP) .................................... 20207009
Dec. 20, 2022 (GB) ..................................... 2219308

(51) Int. Cl.

| | |
|---|---|
| ***H04N 7/18*** | (2006.01) |
| ***H04N 5/77*** | (2006.01) |
| ***H04N 7/04*** | (2006.01) |
| *H04N 19/103* | (2014.01) |
| *H04N 19/136* | (2014.01) |
| *H04N 19/177* | (2014.01) |

(52) U.S. Cl.
CPC ............... *H04N 7/181* (2013.01); *H04N 5/77* (2013.01); *H04N 7/04* (2013.01); *H04N 19/103* (2014.11); *H04N 19/136* (2014.11); *H04N 19/177* (2014.11)

(58) Field of Classification Search
CPC ........... H04N 7/181; H04N 5/77; H04N 7/04; H04N 19/103; H04N 19/136; H04N 19/177; H04N 21/43622; G08B 13/19671
USPC .......................... 348/159, 143, 153; 386/248
See application file for complete search history.

(56) References Cited

U.S. PATENT DOCUMENTS

| | | | | |
|---|---|---|---|---|
| 8,723,952 | B1 * | 5/2014 | Rozenboim ............ | H04N 5/913 348/143 |
| 9,426,543 | B1 | 8/2016 | Li | |
| 11,158,352 | B1 * | 10/2021 | Chaganti ................ | G06F 16/71 |

(Continued)

FOREIGN PATENT DOCUMENTS

| | | |
|---|---|---|
| CN | 102388378 A | 3/2012 |
| CN | 104301591 A | 1/2015 |

*Primary Examiner* — Thai Q Tran
*Assistant Examiner* — Stephen R Smith
(74) *Attorney, Agent, or Firm* — Canon U.S.A., Inc. IP Division

(57) ABSTRACT

A video surveillance system comprising a video management system, one or more computer-implemented digital devices and a plurality of application programs, the system being configured to run the programs on one of or across several of the said one or more computer-implemented digital devices, and configured to perform parallel processing of one or more groups of pictures from one or more video streams with the plurality of application programs in one or across several of the said one or more computer-implemented digital devices.

18 Claims, 6 Drawing Sheets

(56) References Cited

U.S. PATENT DOCUMENTS

| | | | | |
|---|---|---|---|---|
| 11,373,685 | B2 * | 6/2022 | Sun | H04N 21/234309 |
| 2011/0109742 | A1 * | 5/2011 | Laganiere | G06V 20/52<br>348/143 |
| 2016/0295157 | A1 * | 10/2016 | Cho | G06T 5/50 |
| 2018/0041733 | A1 * | 2/2018 | Saptharishi | H04N 23/62 |
| 2021/0050035 | A1 * | 2/2021 | Alcantara | G11B 27/309 |
| 2021/0400302 | A1 * | 12/2021 | Muthiah | H04N 19/547 |
| 2021/0409834 | A1 * | 12/2021 | Larrew | G06F 16/78 |
| 2022/0053171 | A1 * | 2/2022 | Naphade | G08B 13/19673 |
| 2023/0336625 | A1 * | 10/2023 | Trenkovic | G06F 16/78 |

* cited by examiner

VIDEO SURVEILLANCE SYSTEM, COMPUTER-IMPLEMENTED VIDEO MANAGEMENT PROCESS, AND NON-TRANSITORY COMPUTER READABLE STORAGE MEDIUM

CROSS REFERENCE TO RELATED APPLICATION

This application is a continuation-in-part, and claims the benefit, of U.S. patent application Ser. No. 17/520,430, presently pending and filed on Nov. 5, 2021, which claims the benefit under 35 U.S.C. § 119(a)-(d) of, and priority to, the following patent applications: European Patent Application No. 20207009.0, filed on Nov. 11, 2020, and United Kingdom Patent Application No. 2219308.0, filed on Dec. 20, 2022. The above cited patent applications are incorporated herein by reference in their entirety.

TECHNICAL FIELD

The present disclosure generally relates to video surveillance.

BACKGROUND

Modern video surveillance systems have evolved into highly complex and often heterogeneous systems comprising a large number of different peripheral devices and computer hardware elements that are tied together via a networked infrastructure, and controlled by means of advanced management software. One important component of modern video surveillance systems is a video recording and processing system that allows video streams from one or more video cameras to be received, stored and processed.

For example, US 2015/0215583 discloses a video surveillance system comprising internet protocol ("IP") cameras, a network, and cloud computing resources having a management resource, a video storage resource, and a viewing and control resource. The IP cameras and cloud computing resources are connected via the network. The IP cameras independently access each of the cloud computing resources. An application software of a device connected to the network identifies one or more objects of interest from the video data of the IP cameras for extraction.

A video management system (VMS), also known as video management software or a video management server, is a component of a camera surveillance system that provides video management services, such as one or more of the following: collecting one or more video streams from one or more video cameras, storing the received one or more video streams to a storage device and providing an interface to view the received one or more live video streams and/or to access one or more stored video streams.

In this rapidly evolving field, surveillance systems and, in particular, video management systems therefore face the constant challenge to support, handle and exploit a great variety of different hardware devices from a large number of different suppliers, wherein each hardware device usually comes with its own driver components and/or interface, such as its own application programming interface (API).

Moreover, it is generally desirable that surveillance systems and, in particular, video management systems are versatile and can be used in different types of applications which may impose different demands or requirements. Moreover, the demands and requirements imposed in a surveillance system may change over time.

When doing analytics on video data (e.g. forensic video data) streamed in a format such as H.264, processing time is of the essence to get fast results that may prevent incidents or help apprehend a perpetrator. Doing video analytics sequentially takes linear time and such time increases with the complexity of the analytics, which means that the time for getting the results may cause loss of life or of property.

Generally speaking, video analytics solutions are extremely resource intensive. Even with efficient, dedicated hardware (e.g. GPU), it may take several seconds to analyse one frame to carry out, for example, face detection/person identification or the like. This means that doing face detection of 1 min of video data may take several minutes. For long sequences, e.g. hours or days of video data, the processing time can be very long, even for simple analytics. For some resource intensive analytics applications such as those performing face identification (which is more difficult than carrying out face detection), the processing time per frame is long (e.g. seconds or minutes). Thus, even analysing a short video sequence may take a substantial amount of time if the processing tasks are done sequentially.

Moreover, non-deep-learning (non-neural-network) analytics are generally light. Those algorithms have been successfully applied to simple objects, e.g. to perform face detection (i.e. not face recognition), license plate recognition (LPR), traffic sign recognition and motion detection. They can usually be run on edge devices using one or more central processing units (CPUs).

Conversely, to make any non-trivial tasks work reliably, deep learning might be needed and might require more effective hardware such as one or more graphics processing unit (GPUs). Such tasks may include face recognition, person detection (persons are generally much more diverse than faces from a detection perspective), action recognition, etc. Non-deep-learning person tracking is usually too bad to be usable. Those tasks can be carried out in real-time if the computation is fast enough, while some other tasks, like video and image super-resolution, in-painting, etc. can usually not yet reliably be performed in real-time.

SUMMARY

The capabilities of a video surveillance system and hardware components of one or more hardware devices therefor may be extended with computer-implemented digital devices. These computer-implemented digital devices, which can be remote from a video management system and/or be cloud-based, can host a variety of application programs for processing video streams and/or groups of pictures thereof transmitted from the video management system and/or transmitted from one or more video and/or media servers upon receipt of instructions from the video management system.

It is an object of at least some aspects described in the present disclosure to solve one or more of the circumstances identified above and/or other circumstances associated with existing video surveillance systems, or at least to provide an alternative to known systems. More preferably, it is an object of the present disclosure to provide analytics results in a fast time by using parallel processing.

According to an embodiment, the present disclosure provides a video surveillance system comprising a video management system, one or more computer-implemented digital devices and a plurality of application programs, the system being configured to run the programs on one of or across several of the said one or more computer-implemented digital devices, wherein the video management system is configured to:

receive one or more video streams from respective one or more video cameras, store the said one or more video streams in a video repository in at least one encoded format comprising respective groups of pictures, each group of picture being assigned at least one identifier and/or at least one timestamp, send to the one or more computer-implemented digital devices, via a computer network, one or more groups amongst the said respective groups of pictures, wherein each of the one or more computer-implemented digital devices is configured to:

receive, via the computer network, one or more of the said respective groups of pictures, process at least one received group of pictures with one or more of the said application programs, resulting in video metadata corresponding to that received group of pictures, and to output, via the computer network, the video metadata to the video management system, the video surveillance system being configured to perform parallel processing of one or more groups of pictures from one or more of the video streams with the plurality of application programs in one or across several of the said one or more computer-implemented digital devices.

Within the context of the present disclosure, the term "group of pictures" should be understood to have the meaning common in the art as used in video coding standards such as H.264, H.265, H.266, VP8, VP9 and AV1. That is to say, a group of pictures is self-contained and can be decoded fully into video pictures/frames. Each Group Of Pictures (GOP), or GOP structure, typically comprises start and finish keyframes whose coding do not depend on other frames within the GOP, and arrangements of predictive and/or bipredictive coded pictures between these keyframes (so-called P and B pictures/frames).

Within the context of the present disclosure, the term "parallel processing" means "parallel computing" as commonly used in the art. This contrasts with sequential processing in which only one processing task is performed at any given time.

According to an embodiment, parallel processing preferably uses two or more processors (CPUs and/or GPUs) and/or two or more cores in at least one multi-core processor (CPU and/or GPU) to process the said one or more groups of pictures from one or more of the video streams with the plurality of application programs in one or across several of the said one or more computer-implemented digital devices. Thus, for example, when the said one or more groups of pictures from one or more of the video streams is processed with the plurality of application programs in one computer-implemented digital device, that digital device preferably runs on a multi-core processor and each core runs at least part of one program, such that the plurality of application programs runs across different cores. Alternatively, and for example, when the said one or more groups of pictures from one or more of the video streams is processed with the plurality of application programs in more than one computer-implemented digital device, each of these digital devices may run on a single-core processor or a multi-core processor to run at least part of one program of the plurality of application programs, such that the plurality of application programs runs across the different processors and/or cores and preferably across different cores within different processors.

Thus, within the context of the present disclosure, "parallel processing" implies performing processing of one or more groups of pictures from one or more video streams with the plurality of application programs, at least in part at the same time, in one or across several of the said one or more computer-implemented digital devices. The application programs referred to in the present invention may advantageously use deep-learning and neural networks to perform resource intensive analytics operations.

Thus, according to an embodiment, the video stream is chopped up in suitable chunks and sent to multiple video analytics applications (and also preferably sent to multiple machines) which can perform the analytics in true parallel, that is to say, at least in part at the same time. Using the H.264 GOP as video chunk size, for example, is a good choice since each chunk is self-contained and can be decoded fully into video frames to be analyzed. Analytics results may then be returned to a central point using the timestamps or other identifiers of the decoded frames (or GOPs) so that a one to one correspondence between (e.g. forensic) video frames and analytics results can be set. Alternatively, each GOP may only have one or two timestamps (i.e. a timestamp for the first frame of the GOP or timestamps for the first and last frames of the GOP) and a correspondence between the video frames and the analytics results can be established on the basis of a known frame number (of a frame between the said first and last frames of the GOP) and a known frame rate (e.g. 30 fps) within a GOP. In other words, it is possible to identify each frame within a GOP by a timestamp and/or a frame number, or any other (appropriate) identifier.

By sending a recorded video stream from a video management system (or alternatively from one or more video and/or media servers upon receipt of instructions from the video management system) to multiple application programs, each getting a video chunk to process, parallelized analytics can be achieved. Each digital device and/or application program preferably returns analytics results as metadata back to the video management system with one or more identifiers and/or one or more timestamps specifying to which video chunk the metadata relates or belongs to. By using such identifiers and/or timestamps, a relationship between a video chunk and returned metadata is formed so that the metadata can be looked up together with a corresponding recorded video part for later inspection. Each digital device may thus be seen as a processing unit, running one or more application programs on any received GOPs.

According to an embodiment of the video surveillance system, the video management system is configured to send at least a group of pictures, amongst the said respective groups of pictures, to several computer-implemented digital devices. In other words, the same group of pictures is sent to several computer-implemented digital devices, each running one or more application programs on that group of pictures.

According to an embodiment of the video surveillance system, the video management system is configured to send at least different groups of pictures, amongst the said respective groups of pictures, to several computer-implemented digital devices. In other words, the different groups of pictures are sent to different computer-implemented digital devices, each running one or more application programs on at least one group of picture. Additionally, a group of pictures may be sent to different computer-implemented digital devices, and each of these different computer-implemented digital devices may run one or more application programs on that same group of pictures. In other words, some of the groups of pictures may be sent to a single computer-implemented digital devices or sent to multiple computer-implemented digital devices. Each digital device may thus process a unique collection of groups of pictures even though some of these groups of pictures might be received for processing by a plurality of computer-implemented digital devices. Alternatively, or additionally, two or more computer-implemented digital devices may also process the same collection of groups of pictures.

According to an embodiment of the video surveillance system, at least some of the respective groups of pictures are part of the same received video stream received from one video camera. Thus, depending on the use case, different parts of the same video stream may be processed by different application programs and/or by different computer-implemented digital devices, for faster processing (preferably by having the different computer-implemented digital devices on different hardware devices) and/or for different purposes (e.g. to obtain different video analytics results using different application programs or the same program trained with different datasets).

According to an embodiment of the video surveillance system, at least some of the respective groups of pictures are part of different received video streams received from different video cameras. Thus, depending on the use case, different video streams may be processed by different application programs and/or by different computer-implemented digital devices, for faster processing (preferably by having the different computer-implemented digital devices on different hardware devices) and/or for different purposes (e.g. to obtain different video analytics results using different application programs).

According to an embodiment of the video surveillance system, the application programs are different instances of the same software program. In other words, these application programs may fully share the same source code. Nevertheless, these programs may be trained using different datasets for machine-learning, and may thus provide different analytics results despite having the same source code.

According to an embodiment of the video surveillance system, the application programs are different software programs. In other words, the applications programs have different source codes, or at least partially different source codes. For instance, one application program may perform motion detection and another application program may perform license plate recognition.

According to an embodiment of the video surveillance system, the at least one encoded format corresponds to a video coding standard chosen in the group comprising H.264, H.265, H.266, VP8, VP9 and AV1. Such formats use GOPs as mentioned above.

According to an embodiment of the video surveillance system, the video management system is configured to associate the video metadata received from the computer-implemented digital devices with respective groups of pictures sent to the computer-implemented digital devices and/or with respective video streams, based on matching identifiers and/or timestamps between the received metadata and the respective groups of pictures sent to the computer-implemented digital devices and/or the respective video streams. The timestamps and/or identifiers (e.g. frame numbers) may be as mentioned above.

According to an embodiment of the video surveillance system, the system comprises a plurality of computer-implemented digital devices, wherein at least two of the computer-implemented digital devices are located on separate hardware devices. For example, for multiple video streams of large sizes multiple, machines with analytics facilities may be needed. These hardware devices may have different hardware capabilities and/or run different application programs on any received GOPs.

According to an embodiment of the video surveillance system, the system comprises a plurality of computer-implemented digital devices, wherein at least two of the computer-implemented digital devices are located on the same hardware device. For example, for smaller analytics jobs one single machine with one or more suitable GPU cards may provide the required parallelism for analytics.

According to an embodiment of the video surveillance system, at least two of the computer-implemented digital devices are located on separate hardware devices and at least two of the computer-implemented digital devices are located on the same hardware device. For example, in a video surveillance system comprising three computer-implemented digital devices, two may be located on the same hardware device and one may be located on a separate hardware device (thus forming one pair of computer-implemented digital devices on the same hardware device, and two pairs of computer-implemented digital devices on different hardware devices).

According to an embodiment of the video surveillance system, at least one of the one or more digital devices comprises a video decoder module configured to decode at least one received group of pictures and at least one of the one or more digital devices is configured to provide an application interface allowing each of the application programs to receive at least a part of a decoded GOP. In some cases, it may not be necessary for one or more of the computer-implemented digital devices to decode or fully decode the received GOPs so as to generate analytics results. For example, a computer-implemented digital device may perform motion detection based on motion vectors embedded in the GOPs. Such a digital device thus does not necessarily need a video decoder module.

Accordingly, the surveillance system allows the creation of customized processed GOPs and/or metadata in a flexible manner, even for video streams captured by video cameras without advanced capabilities. Moreover, when the digital device provides an execution environment for user-installed application programs, the type of video processing may easily be adapted at any time, in particular by installing the desired application programs on the digital device. Moreover, embodiments of the digital device may be implemented by a digital device data processing system separate and remote from a physical video camera. In particular, a digital device may be implemented by a digital device data processing system remote from the video management system or remote from the video management data processing system that implements the video management system. For example, some embodiments of a digital device may be executed on a remote computing infrastructure, remote from the video management system data processing system, such as on a cloud infrastructure. Accordingly, the number of digital devices and the number and complexity of application programs hosted by the digital devices is easily scalable and not restricted by hardware limitations of the video cameras or by the available computing power of the video management data processing system that executes the video management software. Generally, the video camera may be a surveillance camera, such as an IP surveillance camera, networked surveillance camera or the like, or another type of video camera.

According to an embodiment, the present disclosure also provides a computer-implemented video management process for use in a video surveillance system comprising a video management system, one or more computer-implemented digital devices and a plurality of application programs, the system being configured to run the programs on one of or across several of the said one or more computer-implemented digital devices, the computer-implemented video management process comprising:

- receiving one or more video streams from respective one or more video cameras,
- storing the said one or more video streams in a video repository in at least one encoded format comprising respective groups of pictures, each group of picture being assigned at least one identifier and/or at least one timestamp,
- using the video management system to send to the one or more computer-implemented digital devices, via a computer network, one or more groups amongst the said respective groups of pictures, the computer-implemented video management process comprising, in each of the computer-implemented digital devices:

- receiving, via the computer network, one or more of the said respective groups of pictures,
- processing at least one received group of pictures with one or more of the said application programs, resulting in video metadata corresponding to that received group of pictures, and
- outputting, via the computer network, the video metadata to the video management system, the computer-implemented video management process comprising performing parallel processing of one or more groups of pictures from one or more of the video streams with the plurality of application programs in one or across several of the said one or more computer-implemented digital devices.

According to an embodiment of the computer-implemented video management process, the process comprises sending at least a group of pictures, amongst the said respective groups of pictures, to several computer-implemented digital devices. In other words, the same group of pictures is sent to several computer-implemented digital devices, each running one or more application programs on that group of pictures.

According to an embodiment of the computer-implemented video management process, the process comprises sending at least different groups of pictures, amongst the said respective groups of pictures, to several computer-implemented digital devices. In other words, the different groups of pictures are sent to different computer-implemented digital devices, each running one or more application programs on at least one group of picture. Additionally, a group of pictures may be sent to different computer-implemented digital devices, and each of these different computer-implemented digital devices may run one or more application programs on that same group of pictures. In other words, some of the groups of pictures may be sent to a single computer-implemented digital device or sent to multiple computer-implemented digital devices. Each digital device may thus process a unique collection of groups of pictures even though one or some of these groups of pictures might be received for processing by a plurality of computer-implemented digital devices. Alternatively, or additionally, two or more computer-implemented digital devices may also process the same collection of groups of pictures.

According to an embodiment of the computer-implemented video management process, at least some of the respective groups of pictures are part of the same received video stream received from one video camera. Thus, different parts of the same video stream, or different chunks of the same video stream (which chunks can overlap with each other), may be processed by different application programs and/or by different computer-implemented digital devices, for faster processing (preferably by having the different computer-implemented digital devices on different hardware devices) and/or for different purposes (e.g. to obtain different video analytics results using different application programs or the same program trained with different datasets).

According to an embodiment of the computer-implemented video management process, at least some of the respective groups of pictures are part of different received video streams received from different video cameras. Thus, depending on the use case, different video streams may be processed by different application programs and/or by different computer-implemented digital devices, for faster processing (preferably by having the different computer-implemented digital devices on different hardware devices) and/or for different purposes (e.g. to obtain different video analytics results using different application programs).

According to an embodiment of the computer-implemented video management process, the application programs are different instances of the same software program. In other words, these application programs may fully share the same source code. Nevertheless, these programs may be trained using different datasets for machine-learning, and may thus provide different analytics results despite having the same (original) source code.

According to an embodiment of the computer-implemented video management process, the application programs are different software programs. In other words, the applications programs have different source codes, or at least partially different source codes. For instance, one application program may perform motion detection and another application program may perform license plate recognition.

According to an embodiment of the computer-implemented video management process, the at least one encoded format corresponds to a video coding standard chosen in the group comprising H.264, H.265, H.266, VP8, VP9 and AV1. Such formats use GOPs as mentioned above.

According to an embodiment of the computer-implemented video management process, the process comprises using the video management system to associate the video metadata received from the computer-implemented digital devices with respective groups of pictures sent to the computer-implemented digital devices and/or with respective video streams, based on matching identifiers and/or timestamps between the received metadata and the respective groups of pictures sent to the computer-implemented digital devices and/or the respective video streams. The timestamps and/or identifiers (e.g. frame numbers) may be as mentioned above.

According to an embodiment of the computer-implemented video management process, the system comprises a plurality of computer-implemented digital devices, wherein at least two of the computer-implemented digital devices are located on separate hardware devices. For example, for multiple video streams of large sizes, multiple machines with analytics facilities may be needed. These hardware devices may have different hardware capabilities and/or run different application programs on any received GOPs.

According to an embodiment of the computer-implemented video management process, the system comprises a plurality of computer-implemented digital devices, wherein at least two of the computer-implemented digital devices are located on the same hardware device. For example, for smaller analytics jobs one single machine with one or more suitable GPU cards may provide the required parallelism for analytics.

According to an embodiment of the computer-implemented video management process, at least two of the computer-implemented digital devices are located on separate hardware devices and at least two of the computer-implemented digital devices are located on the same hardware device. For example, in a video surveillance system comprising three computer-implemented digital devices, two may be located on the same hardware device and one may be located on a separate hardware device (thus forming one pair of computer-implemented digital devices on the same hardware device, and two different pairs of computer-implemented digital devices on different hardware devices).

According to an embodiment of the computer-implemented video management process, at least one of the one or more digital devices comprises a video decoder module configured to decode at least one received group of pictures and at least one of the one or more digital devices provides an application interface allowing each of the application programs to receive at least a part of a decoded GOP. In some cases, it may not be necessary for one or more of the computer-implemented digital devices to decode or fully decode the received GOPs so as to generate analytics results. For example, a computer-implemented digital device may perform motion detection based on motion vectors embedded in the GOPs. Such a digital device thus does not necessarily need a video decoder module.

According to an embodiment, the invention also provides a non-transitory computer readable storage medium storing a program for causing a computer to execute a computer-implemented video management process for use in a video surveillance system comprising a video management system, one or more computer-implemented digital devices and a plurality of application programs, the system being configured to run the programs on one of or across several of the said one or more computer-implemented digital devices, the computer-implemented video management process comprising:

- receiving one or more video streams from respective one or more video cameras,
- storing the said one or more video streams in a video repository in at least one encoded format comprising respective groups of pictures, each group of picture being assigned at least one identifier and/or at least one timestamp,
- using the video management system to send to the one or more computer-implemented digital devices, via a computer network, one or more groups amongst the said respective groups of pictures, the computer-implemented video management process comprising, in each of the computer-implemented digital devices:

- receiving, via the computer network, one or more of the said respective groups of pictures,
- processing at least one received group of pictures with one or more of the said application programs, resulting in video metadata corresponding to that received group of pictures, and
- outputting, via the computer network, the video metadata to the video management system, the computer-implemented video management process comprising performing parallel processing of one or more groups of pictures from one or more of the video streams with the plurality of application programs in one or across several of the said one or more computer-implemented digital devices.

The video management system may be implemented as a video management computer program executed on a video management data processing system. In particular, the video management system may comprise a video recording server, which may be implemented as a recording server process executed by the video management data processing system, where the recording server is configured to receive and store the input video streams and to send GOPs of the input video streams to at least one of the one or more digital devices.

To this end, the video management data processing system may comprise one or more processing units and one or more memory units having stored thereon program code configured, when executed by the one or more processing units, to implement the video management system, in particular the recording server process. The data processing system implementing the video management system is often, though not necessarily, installed on the premises of the facility where the video cameras are located, thus avoiding the need for transmitting the video streams and/or GOPs thereof from the cameras over public communication networks. In some embodiments, the video management data processing system is connected to the one or more video cameras via a local computer network, such as a local area network, thus facilitating large data volumes to be efficiently received by the video management system, in particular without depending on an external internet connection.

The video streams received by the video management system are digital video streams, e.g. in the form of respective streams of video data. Each digital video stream may be an encoded video stream, encoded using a suitable video encoding protocol such as H.264 or H.265. The video management system may store the input video streams as encoded video streams. Similarly, the output interface may provide the input video streams and/or previously stored video streams as suitably encoded video streams and/or GOPs thereof.

The present disclosure may preferably use a video repository, which may be a suitable data storage device for storing media content, in particular video content. In particular, the video repository may be a suitable media database, in particular a video database. The video repository may be implemented as part of the video management data processing system or it may be implemented by a separate data processing system in communicative connection with the video management data processing system, in particular with the recording server.

In some embodiments, the video management system is configured to send GOPs of the input video streams to one or more remote digital devices, and to concurrently store the input video streams in the video repository, i.e. the digital devices may receive and process any received GOPs in quasi-real time as one or more live video feeds. Accordingly, the metadata generated by each digital device may be fed into a video-receiving system in quasi real-time, e.g. for quasi-real-time or live viewing by an operator.

According to another aspect, disclosed herein are embodiments of a computer-implemented digital device configured to emulate at least one physical video camera for sending GOPs and/or video metadata via a computer network to a video-receiving system, which may be remote from the digital device. Accordingly, the digital device is configured to operate as a video source, such as a video server, for sending GOPs and/or video metadata via a computer network to a video-receiving system. The digital device may implement a video pipeline for processing the received GOPs. The processing may result in video metadata, and optionally also in one or more processed GOPs.

Each computer-implemented digital device may emulate at least one physical video camera, i.e. the digital device may be configured to provide one or more interfaces allowing external systems (e.g. a video-receiving system as mentioned above) to communicate with the digital device as if the digital device were a physical video camera by retrieving GOPs and/or making camera settings. The digital device may thus be configured/constructed to give the appearance to a video-receiving system of being a physical video camera. In particular, in an embodiments, the computer-implemented digital device comprises one or more interfaces that are accessible to a video-receiving system, which may be remote from the computer-implemented digital device, such that the video-receiving system can interact with the computer-implemented digital device in the same way as with a physical video camera. To the video-receiving system, the computer-implemented digital device may be indistinguishable from a physical video camera. For example, the digital device may be recognizable by the video-receiving system as a video camera on a computer network. It will be appreciated, however, that the digital device does not comprise any optical system, image sensor or the like, for optically capturing video images. Instead, the digital device is configured to receive GOPs, in particular from the video management system. The digital device may be configured to output, via the one or more interfaces, a processed version of any of the received GOPs, such that the video-receiving system receives the, optionally processed, GOPs from the digital device in the same way or in a similar way as the video-receiving system would receive a video stream and/or GOPs thereof from a physical video camera. Accordingly, the computer-implemented digital device may be considered a virtual digital device. The digital device may further output video metadata.

According to the present disclosure, one or more physical video cameras may be tethered to the same digital device. For instance, several physical video cameras tethered to the same digital device and looking at the same target area (or scene) may advantageously be provided with different capabilities, e.g. have different fields of view or different resolutions. One of these physical video cameras may for instance have a narrower field of view as compared to another physical video camera connected to the same digital device. More generally speaking, these physical video cameras may be operated for independent reasons such as for displaying different and/or complementary views or details of the target area. In such a case where several physical video cameras are tethered to the same digital device, that digital device may advantageously be configured to provide the same execution environment for one or more user-installed application programs, thus allowing to process at least a part of the received GOPs with the same one or more user-installed applications programs (i.e. resulting in processed GOPs and/or in video metadata associated with the received GOPs). For instance, a digital device may provide an execution environment for a user-installed application program configured to carry out facial recognition in the GOPs received (directly or indirectly) from the different physical video cameras tethered to that digital device.

Conversely, one physical video camera may be tethered to several digital devices. In other words, a physical video camera may be emulated several times. For instance, the GOPs received from that physical video camera may be processed by a first application program on a first digital device to detect human faces in the received GOPs, and the same received GOPs may be processed by a second application program on a second digital device to detect vehicles in the received GOPs. Alternatively, or additionally, a GOP may be processed multiple times on the same digital device and/or may further be processed on another digital device. For instance, a processed GOP in which a human face has been detected by a user-installed application program may further be processed to carry out facial recognition on the detected human face, for instance on another digital device and/or with another user-installed application program.

Each of the one or more digital devices according to the present disclosure operates independently from the one or more physical video cameras to which it is tethered to (or which is/are tethered to them). In other words, each digital device takes on attributes of the one or more physical video cameras to which that digital device is tethered to (or which are tethered to that digital device) but has a life of its own. The said one or more digital devices are thus not to be confused with virtualized video cameras or virtual video cameras, as they are tethered to physical video cameras.

In an embodiment, each digital device operates based on one or more GOPs received (directly or indirectly) from one or more physical video cameras and may provide one or more interfaces allowing a video-receiving system to communicate with that digital device as if that digital device were that or these physical video cameras by retrieving video streams and/or GOPs thereof and/or making camera settings. Each of the one or more digital devices is further configured to output, via the one or more interfaces, video metadata to the said video-receiving system.

In an embodiment, at least one digital device may be configured to emulate at least one app-enabled camera. For the purpose of the present description, the term app-enabled camera is intended to refer to a video camera, in particular a physical video camera, comprising a processing unit on which one or more software application programs can be installed for providing the video camera with additional digital capabilities. This may allow to extend the lifecycle of physical video cameras which would otherwise be seen as obsolete. The app-enabled camera may be an IP camera. In particular, the term app-enabled camera encompasses a camera on which such application programs can be installed at any time after manufacturing, e.g. by a user of the video camera. To this end, an app-enabled camera may comprise a processing unit and a suitable operating system, e.g. an Android-based operating system, configured to provide an execution environment for facilitating execution of user-installed application programs, in particular application programs configured, when executed by the processing unit, to cause the processing unit to process a video stream recorded by the video camera and/or GOPs thereof and/or to provide other functionality to the camera.

Accordingly, the digital device may comprise a suitable operating system, e.g. an Android-based operating system, configured to provide an execution environment for facilitating execution of application programs, in particular user-installed application programs. The application programs may be configured, when executed by a data processing system, in particular a cloud-based processing resource, to cause the digital device to process a GOP received from the video management system so as to generate a processed GOP and/or video metadata derived from the received and/or processed GOPs. The digital device is configured to output the processed GOPs and/or the video metadata to a video-receiving system, e.g. to a remote data processing system, such as to the video management system or to another video-receiving system for receiving GOPs, video streams, and/or associated video metadata.

For the purpose of the present description, the term digital device as used herein is intended to refer to a computer program configured, when executed by a digital device data processing system, to emulate at least one physical electronic device, in particular to emulate at least one physical video camera, such as at least one physical IP camera. In other words, each of the one or more digital devices is configured to emulate a physical electronic device by providing one or more interfaces allowing the video management system to communicate with that digital device as if that digital device were a physical electronic device. The digital device may be a cloud-based digital device. The term cloud-based digital device as used herein is intended to refer to a computer program configured, when executed by a cloud-based computing resource of a cloud-based computing architecture, to emulate at least one physical electronic device, in particular to emulate at least one physical video camera.

In particular, embodiments of the digital device disclosed herein are configured to emulate at least one physical app-enabled video camera. To this end, the digital device is configured to:

- receive one or more GOPs from a video management system,
- provide an execution environment for one or more user-installed application programs, the execution environment allowing the one or more user-installed application programs to process at least a part of the received GOP resulting in a processed GOP and/or in video metadata associated with the received GOP, and to
- output the processed GOP and/or the video metadata via the one or more interfaces to the said video-receiving system.

To this end, the digital device data processing system may comprise a processing unit and memory having stored thereon program code configured, when executed by the processing unit, to implement the digital device. It may be appreciated that a single digital device data processing system may implement one or more digital devices. Similarly, it will be appreciated that different digital devices may be implemented by a single data processing system or by respective, separate digital device data processing systems. The one or more digital device data processing systems may thus be communicatively connected to the video management data processing system e.g. via a computer network. In some embodiments, one or more cloud-based digital devices may be implemented by one or more virtual machines, e.g. in a cloud architecture. The present disclosure refers to application programs being deployed on the digital device or being executed by the digital device. It will be appreciated that this is intended to refer to the application program being executed by the digital device data processing system implementing the digital device, e.g. by a cloud computing architecture on which a cloud-based digital device is executed.

Generally, a processing unit may include a suitably programmed microprocessor or any other circuit and/or device suitably adapted to perform the data- and/or signal-processing functions described herein. In particular, the processing unit may comprise a general- or special-purpose programmable microprocessor, such as a central processing unit (CPU), a digital signal processing unit (DSP), an application specific integrated circuit (ASIC), a programmable logic array (PLA), a field programmable gate array (FPGA), a Graphical Processing Unit (GPU), a special purpose electronic circuit, etc., or a combination thereof. To this end, the processing unit may be suitably programmed by software and/or firmware configured to be executed by the processing unit. The software and/or firmware may be stored on a suitable memory of the processing unit. In some embodiments, the processing unit is a suitably programmed computer or other data processing system.

In some embodiments, at least one of the one or more digital devices comprises a video decoder module configured to decode any of the received GOPs. The decoder module may be configured to decode GOPs encoded using a suitable video encoding standard, such as the H.264 standard or the H.265 standard. The digital device may be configured to provide an application interface and/or other services allowing one or more application programs deployed on by the digital device to receive at least a part, e.g. individual frames, of the decoded GOPs. The application interface may further allow one or more application programs executed by the digital device to return processed GOPs. In some embodiments, at least one of the one or more digital devices comprises a video encoder module configured to re-encode the received GOPs and/or the processed GOPs. The encoder module may be configured to encode the GOPs according to a suitable video encoding standard, such as the H.264 standard or the H.265 standard.

In some embodiments, at least one of the one or more digital devices comprises a communication module configured to establish a video tunnel or other suitable communication session with the video management system, and to receive GOPs via the video tunnel or otherwise within the context of the established communication session. According to the present disclosure, the digital device is configured to transmit the processed GOPs and/or associated video metadata to the video management system, for example to return the processed GOPs and/or associated video metadata to the video management system via said established video tunnel or otherwise within the context of the same established communication session during which the original GOPs have been received by the digital device.

The digital device is configured to emulate at least one app-enabled camera. Accordingly, the digital device may comprise a video server component configured to operate as a video server recognisable by a video-receiving client component, which may be remote from the digital device, and configured to provide GOPs and/or metadata to the video client component. The video server component may be integrated into the communication module. The video server component may be configured to implement a network control protocol configured for use in communication systems to control streaming media servers, such as the Real Time Streaming Protocol (RTSP). Alternatively or additionally, the video server component may be configured to operate according to a version of the Open Network Video Interface Forum (ONVIF) Core specification, such as the ONVIF Core specification version 2.4. Additionally, the server component may be configured to operate according to a version of one or more ONVIF Profiles.

It will be appreciated that the digital device is distinguished from a physical video camera in that a physical video camera comprises an image sensor. Accordingly, any video processing performed by a physical video camera, e.g. by an app-enabled physical video camera, is performed on the video stream captured by the image sensor. Embodiments of the digital device disclosed herein, on the other hand, receive one or more GOPs, via a computer network from an external data processing system, and process the received GOPs, in particular decode the received GOPs and process the decoded GOPs.

The digital device may be configured to host a variety of different application programs. Examples of application programs include application programs that process at least a part of a video stream, e.g. at least one GOP, so as to create metadata associated with that GOP, e.g. metadata indicative of one or more detected properties or features of the video stream, e.g. so as to perform object detection, event detection, motion detection and/or the like. Some or more of these processing techniques may comprise the application of machine learning techniques. One example of an application program may add GPS location data to a place within a field of view depicted in the video, e.g. so as to identify a position of a crime. Other examples of video processing may include detecting or otherwise adding metadata regarding a crime, such as creating data from various cameras stitched together. Accordingly, in some embodiments, a digital device may be configured to receive multiple GOPs, and generate metadata based on a combination of the multiple GOPs.

Other examples of application programs include an application program that processes at least a part of a video stream so as to modify the video stream, i.e. so as to create at least a part of a processed GOP. Examples of such processing include a process for image/video enhancement and/or the like. For example, an application program may upscale a low resolution GOP to a higher resolution GOP and/or enhance image quality and/or create super resolution from poor quality GOPs. This allows to use or extend the lifecycle of previous generation cameras, such as VGA cameras.

Alternatively, or additionally, the said one or more digital devices may upscale one or more low resolution GOPs to higher resolution GOPs and/or enhance image quality and/or create super resolution from poor quality GOPs and then provide one or more enhanced GOPs to one or more user-installed application programs. In other words, a digital device according to the invention may run super resolution on raw camera data prior to sending one or more processed GOPs to one or more user-installed application programs.

At least some embodiments of the video management system disclosed herein are capable of receiving GOPs from a variety of different cameras. Accordingly, in some embodiments, the input interface of the video management system comprises one or more camera drivers, each camera driver configured to receive GOPs from at least one type of video camera. In some embodiments, each camera driver is configured to add one or more time stamps to the received GOP so as to provide the input GOP as a time-stamped input GOP. The video management system may then be configured to store the GOPs with the added timestamps and to use the added timestamps as canonical time stamp (i.e. timestamps having a uniform format) for the purpose of the subsequent processing.

In some embodiments, the video management system is configured to selectively feed a currently received GOP or a previously stored GOP, i.e. GOP previously stored in the video repository, to the digital device. Feeding a previously stored GOP to a digital device may comprise replacing the canonical time stamp with a modified time stamp, the modified time stamp corresponding to a current time, i.e. the time at which that GOP is sent to the digital device.

In some embodiments, the video management system further comprises an index server for indexing the metadata stored in a metadata repository, in particular a metadata database. Accordingly efficient subsequent retrieval is of the stored metadata is facilitated.

The video management system, in particular the recording server, is configured to receive GOPs and/or associated metadata, from one or more of the digital devices. In some embodiments, the video management system is configured to determine whether a received processed GOP is received from a digital device and whether the received processed GOP corresponds to—i.e. is a processed version of—a previously stored GOP, and to selectively add a time stamp to the received processed GOP and/or the received metadata, the added time stamp corresponding to the canonical time stamp of the previously stored GOP. In particular, detecting whether the received processed GOP corresponds to a previously stored GOP may comprise determining whether the processed GOP and/or metadata is received responsive to the video management system having fed a previously stored GOP with a modified time stamp to the digital device. The video management system may e.g. make this determination when the video management system has received the processed GOP, preferably as part of the same session, e.g. via the same video tunnel, via which a previously stored GOP with a modified time stamp has been fed to the digital device.

It will be appreciated that the video management system and/or the digital device may receive and process additional media streams and/or additional sensor data, such as audio signals, radar signals, LIDAR signals etc. The digital device may provide such additional media streams and/or sensor data to the application programs hosted by the digital device so as to allow the application program to process the additional media streams in combination with any received GOPs.

The video management system may be configured to transmit GOPs to the digital device via a suitable computer network, such as the internet.

The present disclosure relates to different aspects, including the video surveillance system described above and in the following, further methods, systems, devices and product means, each yielding one or more of the benefits and advantages described in connection with one or more of the other aspects, and each having one or more embodiments corresponding to the embodiments described in connection with one or more of the other aspects described herein and/or as disclosed in the appended claims.

In particular, the present disclosure further relates to a computer-implemented video management process, comprising:

receiving one or more video streams from respective one or more video cameras and/or other video sources, storing one or more input video streams, each input video stream corresponding to a respective one of the received video streams, in a video repository, and sending from a video management system, via a computer network, one or more of the input video streams and/or one or more of the stored video streams to one or more digital devices, each of the one or more digital devices being configured to emulate at least one physical video camera, and to send video streams and/or video metadata via a computer network to a video-receiving system, which may be remote from the digital device, wherein each of the one or more digital devices is configured to emulate a physical video camera, and each of the one or more digital devices is further configured to output, via the one or more interfaces, the said video streams and/or video metadata to the said video-receiving system.

It is noted that features of the various embodiments of a computer-implemented method described above and in the following may be implemented at least in part in software or firmware and carried out on a data processing system or other processing unit caused by the execution of program code means such as computer-executable instructions. Here and in the following, the term processing unit comprises any circuit and/or device suitably adapted to perform the above functions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), Graphical Processing Units (GPU), special purpose electronic circuits, etc., or a combination thereof.

The present disclosure further relates to embodiments of a computer program configured to cause a data processing system to perform the acts of the computer-implemented method described above and in the following. A computer program may comprise program code means adapted to cause a data processing system to perform the acts of the computer-implemented method disclosed above and in the following when the program code means are executed on the data processing system. The computer program may be stored on a computer-readable storage medium, in particular a non-transient storage medium, or embodied as a data signal. The non-transient storage medium may comprise any suitable circuitry or device for storing data, such as a RAM, a ROM, an EPROM, EEPROM, flash memory, magnetic or optical storage device, such as a CD ROM, a DVD, a hard disk, and/or the like.

BRIEF DESCRIPTION OF THE DRAWINGS

The above and other aspects will be apparent and elucidated from the embodiments described in the following with reference to the drawing in which.

DETAILED DESCRIPTION

The following description is provided to assist in understanding the teachings disclosed herein and will focus on specific implementations and embodiments of the teachings. This focus is provided to assist in describing the teachings and should not be interpreted as a limitation on the scope or applicability of the teachings.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the imprint and lithography arts.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Figure 1:
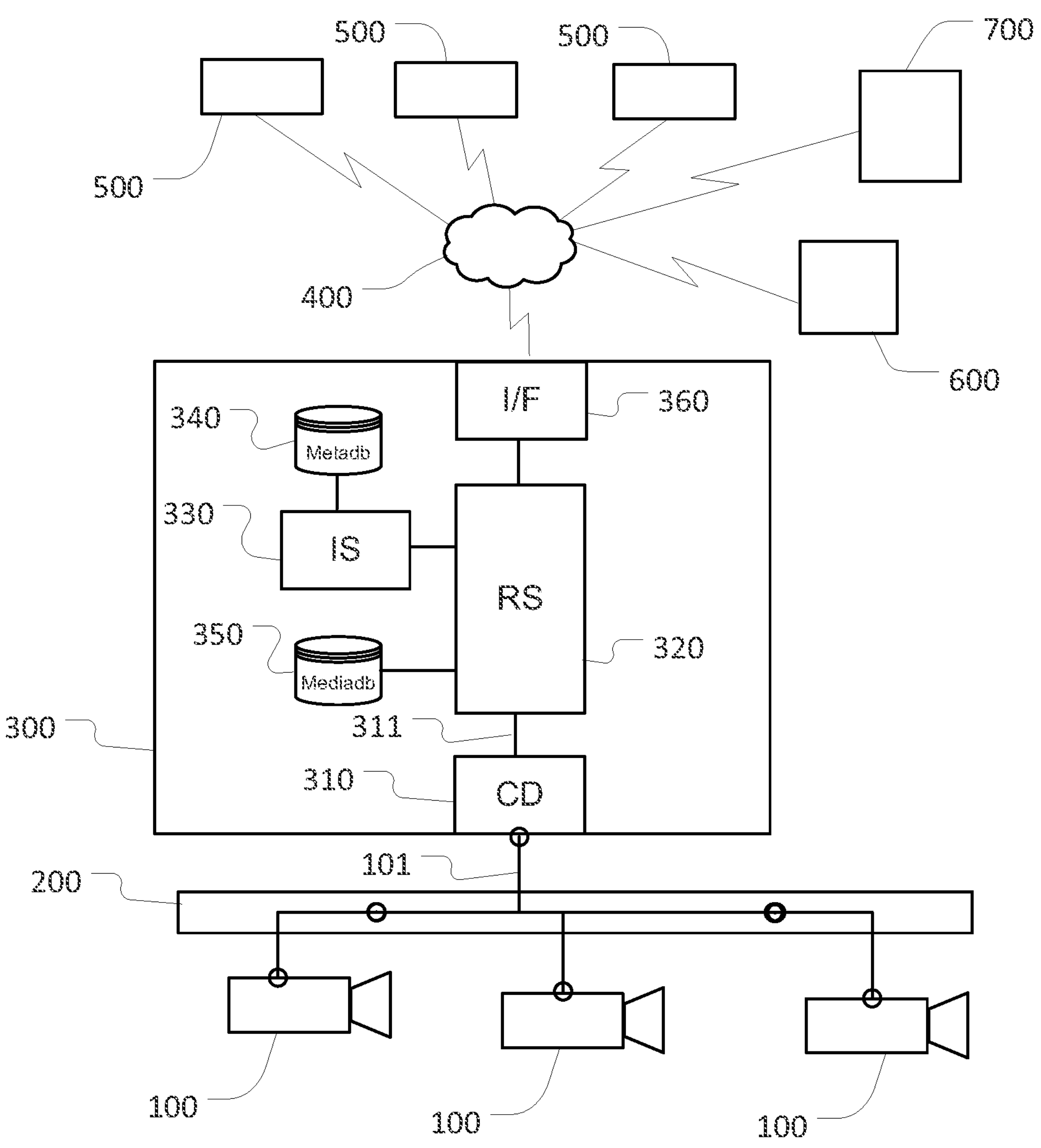
FIG. 1 schematically illustrates an example of a video surveillance system.

FIG. 1 schematically illustrates an example of a video surveillance system.

The video surveillance system comprises a number of video cameras 100, a video management system 300 and a number of digital devices 500. In the example of FIG. 1 as well as in some of the following figures the digital devices are shown as a being remote from the video management system, in particular as being executed by a digital device data processing system remote from the video management data processing system on which the video management system is executed. In particular, embodiments are described where the digital device is cloud-based. Optionally, the video surveillance system may comprise additional components, such as a video analytics system 600 and/or other video-receiving systems 700. These may be implemented on a data processing system remote from the video management system, as illustrated in FIG. 1, or they may be executed on the same data processing system as the video management system.

While FIG. 1 illustrates a system with three video cameras, it will be appreciated that other examples may include fewer than three or more than three cameras. Generally, a video surveillance system may include one or a plurality of video cameras. The one or more video cameras are typically distributed across an area where surveillance is desired e.g. across the premises of a facility where surveillance is desired. The number and position of cameras as well as the type of camera to be installed may be selected based on factors such as the level of surveillance desired, the size of the facility and/or the complexity of the layout of the facility.

The video cameras may be conventional video cameras known as such in the art of video surveillance. It will be appreciated that the video surveillance system may include a plurality of video cameras of the same type, i.e. video cameras having the same capabilities, providing the same type of video output, in the same format etc. Alternatively, many examples of video surveillance systems may include cameras of different types, e.g. video cameras having different capabilities, providing video streams of different resolutions, in different formats or outputting additional metadata associated with the video. Examples of capabilities of video cameras may include one or more of the following: audio recording, video recording in visible wavelength ranges and/or in infrared wavelength ranges, such as near-infrared wavelength ranges, control functions such as pan or zoom, image processing capabilities, motion detection, etc.

The video cameras 100 are communicatively connected to the video management system 300. To this end, the video cameras 100 may be connected to the video management system via a local area network 200 or in a different suitable manner, e.g. via point-to-point wired and/or wireless connections, or the like. For example, the video cameras may be connected to the video management system via an Ethernet connection. An example of a wireless connection includes a 5G network. It will be appreciated that some examples of video surveillance systems may include additional sensors providing sensor signals and/or media streams different from video streams, such as audio signals, radar signals, Lidar signals, etc.

The video management system 300 receives video streams from the video cameras 100 and, optionally, input signals from other sources. The video management system is configured to store the received video streams in a media repository 350, and provides an interface 360 for accessing the live video streams and/or GOPs thereof, and to access video streams and/or GOPs thereof stored in the media repository 350. The media repository 350 may be media database or other suitable storage device for storing media content. The video management system may include a user interface allowing users to view the live video and/or store videos and/or to control operation of one or more of the video cameras.

The video management system 300 may be embodied as a software program executed by a suitable data processing system, e.g. by one or more server computers. The data processing system implementing the video management system is often, though not necessarily, installed on the premises of the facility where the video cameras are located, thus avoiding the need for transmitting the video streams from the cameras over public or other communication networks.

The video management system comprises one or more camera drivers 310 for providing interfaces to respective types of video cameras. Different video cameras may provide their video streams and/or GOPs thereof in different formats, e.g. using different encoding schemes and/or different network protocols. Similarly, different cameras may provide different interfaces for camera control such as zoom, or pan. Accordingly, the video management system 300 may include a plurality of different camera drivers 310 configured to cooperate with respective camera types. In particular, the camera drivers 310 may implement one or more suitable network protocols and/or other communication standards for communicating with video cameras and/or other surveillance equipment. Examples of such protocols and standards include the Open Network Video Interface Forum (ONVIF) standard and the Real Time Streaming Protocol (RTSP).

The camera drivers 310 further add one or more time stamps to the received video signals 101 so as to ensure that the video streams, and/or GOPs thereof, which are stored and subsequently supplied by the video management system, include uniform timestamps. The added uniform timestamps will also be referred to as canonical timestamps. A canonical time stamp is indicative of the time of receipt, by the video management system, of the video streams 101 from the respective video cameras 100. The camera drivers thus provide uniformly time-stamped input video streams 311, each time-stamped input video stream 311 corresponding to a respective one of the received video streams 101.

The video management system 300 comprises a recording server 320. The recording server may be embodied as a software program module executed by a suitable data processing system, e.g. by one or more server computers. The recording server receives the input video streams 311 originating from the respective video cameras 100 from the corresponding camera drivers 310. The recording server stores the received input video streams in a suitable media storage device, such as a suitable media database. It will be appreciated that the media repository 350 may be part of the video management system 300 or it may be separate from, but communicatively coupled to the video management system. The media repository 350 may be implemented as any suitable mass storage device, such as one or more hard disks or the like. The storing of the received input video streams is also referred to as recording the received input video streams. The recording server may receive additional input signals, such as audio signals, motion detection signals, etc. associated with the input video streams. The additional input signals may originate from the video cameras 100 and/or from other signal sources, such as from additional surveillance sensors. The video management system may store the additional input signals in the media repository 350 and/or in a separate storage device.

The recording server 320 is further configured to selectively provide the live input video streams 311 and/or previously stored input video streams retrieved from the media repository 350 and/or GOPs thereof via a suitable interface 360 to one or more external entities 500, 600, 700, respectively.

To this end, the interface 360 may provide a network interface for providing live video streams and/or previously stored video streams and/or GOPs thereof via a communication network 400 to one or more digital devices 500, such as cloud-based digital devices. To this end, the interface 360 may be configured to establish respective video tunnels and/or other communication sessions with the digital devices 500. The interface 360 may implement one or more suitable network protocols and/or other communication standards for communicating with other surveillance equipment. Examples of such protocols and standards include the Open Network Video Interface Forum (ONVIF) standard and the Real Time Streaming Protocol (RTSP).

Examples of the operation of the digital devices 500 and the interaction between the video management system and the digital devices will be described in more detail below and with reference to FIGS. 2-7.

Optionally, the interface 360 may implement different communication channels to other types of external entities. Examples of external entities include a video-receiving system 700, which may receive video streams and/or GOPs thereof and provide functionality for viewing and/or processing the video streams and/or GOPs thereof. Other examples of external entities include a video analytics system 600, which may receive video streams and/or GOPs thereof and perform video processing for analysing the video streams and/or GOPs thereof. To this end, the video analytics system may perform object detection, object recognition, motion detection and/or other types of video analytics. The video analytics system may create video metadata indicative of the results of the video analytics performed. For example, the video analytics systems may create video metadata indicative of recognized objects in a video stream and/or in a GOP. The metadata may include information about the spatial and temporal positions of recognised objects in the video stream and/or in a GOP and/or information about the identity of the recognized object. The analytics systems may store the generated metadata in a suitable metadata repository. In some embodiments, the analytics systems may communicate the generated metadata back to the video management system. The video management system may store the returned metadata in a suitable metadata repository 340, such as a suitable metadata database, which may be separate from or integrated into the media repository 350. To this end, the video management system may include an index server 330. The index server may be embodied as a software program module executed by a suitable data processing system, e.g. by one or more server computers. The index server may receive metadata and store the received metadata in the metadata repository 340. The index server may further index the stored metadata so as to allow faster subsequent search and retrieval of stored metadata. Metadata received from the external analytics systems 600 may be received by the recording server 320 and forwarded to the index server 330. Alternatively or additionally, the index server may receive metadata directly from one or more analytics systems 600.

The interface 360 may implement different types of interfaces. For example, the interface may provide an application interface, e.g. in the form of a software development kit and/or one or more communication protocols, such as a suitable messaging protocol, e.g. SOAP, XML, etc. Accordingly, the interface may operate as a gateway to different types of systems.

The communication network 400 may be the internet or another suitable communication network. It will be appreciated, however, that at least some of the other entities 500, 600 and 700 may reside on the same data processing system as the video management system or on a data processing system connected to the video management system via a local area network, instead.

Figure 2:
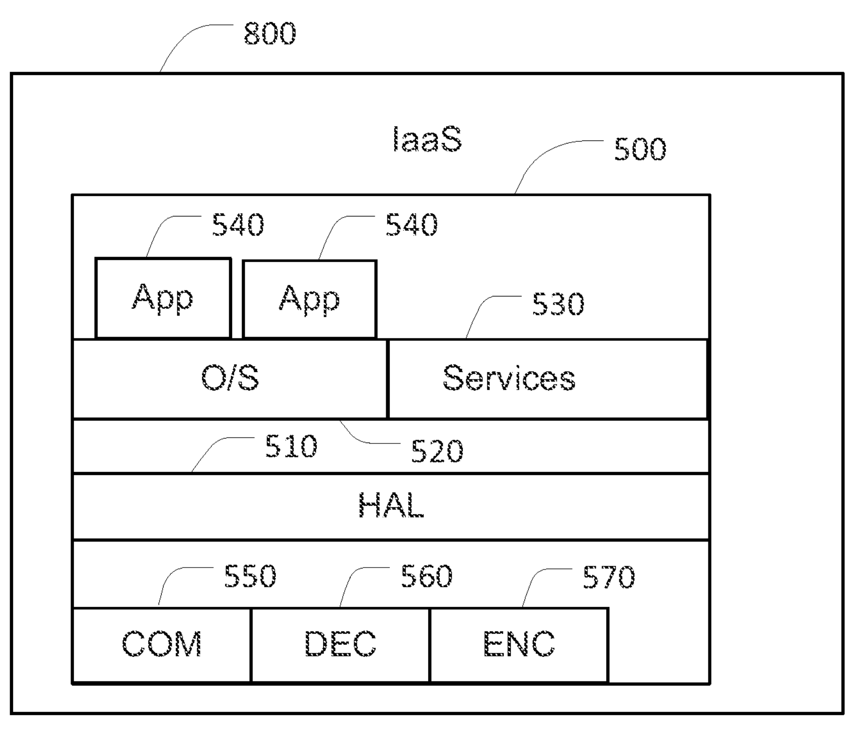
FIG. 2 schematically illustrates an example of a cloud-based digital device emulating an app-enabled video camera.

FIG. 2 schematically illustrates an example of a cloud-based digital device emulating an app-enabled video camera.

The cloud-based digital device 500 may be implemented as a computer program executed on a cloud-based computing platform 800 such as an infrastructure as a service (IaaS) architecture.

The digital device includes a suitable operating system 520 providing an execution platform for one or more user-installed application programs 540. The application programs 540 may be deployed during runtime of the digital device 500, e.g. by obtaining the application programs in an app store or similar application program repository. In some embodiments, the operating system is an Android-based operating system. To this end, the digital device may include a hardware abstraction layer 510 allowing the operating system and/or other software components of the digital device 500 to be executed on the cloud computing architecture 800.

The digital device 500 further comprises a service component 530 configured to provide the application programs 540 with various services, e.g. allowing the application programs to request video streams and/or GOPs thereof and/or individual frames of video streams, when being executed on the digital device.

The digital device further comprises a communication module 550 allowing the digital device to communicate with the video management system using a suitable network protocol, such as RTSP. The digital device 500 comprises a decoder module 560 configured to decode the received video streams and/or GOPs thereof. For example, the decoder module 560 may be configured to receive and decode video streams and/or GOPs thereof encoded according to H.264 and/or H.265 and/or another suitable encoding standard for encoding video streams. The digital device 500 may thus allow one or more application programs 540 executed by the digital device to access the received and decoded video stream and/or GOPs thereof. The application programs may process the video stream and/or GOPs thereof and/or individual frames of the video stream. Some application programs may process the video stream and generate a modified video stream and/or modified GOPs thereof. Alternatively or additionally, one or more of the application programs may process the received video stream and/or GOPs thereof so as to create metadata based on the video streams and/or GOPs thereof.

To this end, the digital device 500 may be configured to host a variety of different application programs. Examples of application programs include application programs that process at least a part of a video stream and/or GOPs thereof and/or one or more frames of a video stream, so as to create metadata associated with the video stream and/or GOPs thereof and/or frames thereof, e.g. metadata indicative of one or more detected properties or features of the video stream, e.g. so as to perform object detection, event detection, motion detection and/or the like. Some or more of these processing techniques may comprise the application of machine learning techniques. One example of an application program may add GPS location data to a place within field of view depicted in the video, e.g. so as to identify a position of a crime. Other examples of video processing may include detecting or otherwise adding metadata regarding a crime, such as creating data from various cameras stitched together. Accordingly, in some embodiments, a digital device may be configured to receive multiple video streams and/or GOPs thereof, and generate metadata based on a combination of the multiple videos and/or GOPs thereof.

Alternatively, an application program on a digital device may call one or more physical video cameras which are tethered to that digital device (or to which the digital device is tethered to) to enquire about their GPS location. This allows for instance to search, in an application program, for physical video cameras by GPS coordinates (which physical video cameras would otherwise be missed when searching by GPS location). Knowing the GPS location of a physical video camera may also allow an application program to create useful correlations, such as GPS correlation to depth of field (or DOP, which may for instance be calculated by that or another application program). GPS location is generally more useful when it relates to outdoor physical video cameras.

Other examples of application programs include application programs that process at least a part of a video stream and/or GOPs thereof so as to modify the video stream and/or GOPs thereof, i.e. so as to create at least a part of a processed video stream and/or processed GOPs. Examples of such processing include a process for image/video enhancement and/or the like. For example, an application program may upscale a low-resolution video to a higher-resolution video and/or enhance image quality and/or create super resolution from poor quality video.

The communication module is further configured to allow the digital device 500 to operate as a video server on a computer network, i.e. to provide video streams and/or GOPs thereof to a video stream receiving system. In particular, the digital device may output video streams and/or GOPs thereof received from the video management system and/or it may output processed video streams, i.e. video streams based on the received video stream but modified by one or more of the application programs 540, and/or processed GOPs. To this end, the digital device comprises an encoder module 570 configured to encode the video stream and/or GOPs thereof to be output by the digital device. For example, the encoder module 570 may be configured to encode video streams and/or GOPs thereof according to H.264 and/or H.265 and/or another suitable encoding standard for encoding video streams and/or GOPs thereof.

The digital device 500 is thus configured to emulate at least one physical video camera which may be recognised on a computer network as a video camera and to provide suitably encoded video streams and/or GOPs thereof to external video-signal-receiving systems via the computer network. Generally, emulating a video camera comprises supporting APIs such as those defined in RTSP, ONVIF and/or the like, conventionally supported by video cameras, in particular APIs for retrieving video streams and/or GOPs thereof, for making camera settings, and/or the like. In particular, the digital device 500 is configured to emulate at least one app-enabled video camera, which allows application programs to be deployed and which outputs results of the video processing performed by the application programs on the video stream and/or GOPs thereof. Instead of operating on video streams directly obtained by an image sensor, as is the case in a physical video camera, the digital device operates on a video stream and/or GOPs thereof received from the video management system disclosed herein.

Figure 3:
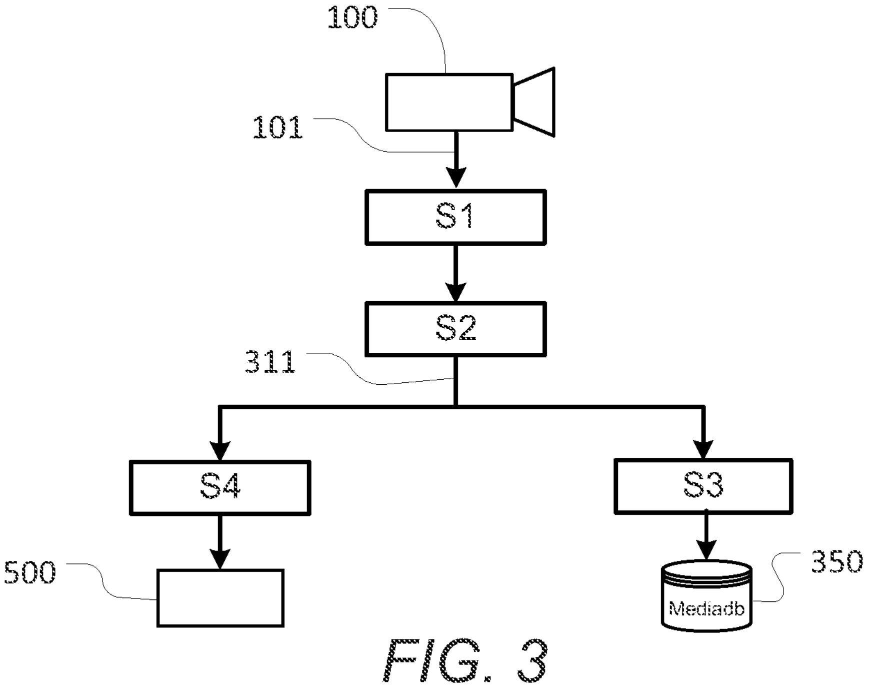
FIG. 3 schematically illustrates an example of a computer-implemented video management process.

FIG. 3 schematically illustrates an example of a computer-implemented video management process. The process of FIG. 3 may e.g. be performed by the video management system of the video surveillance system of FIG. 1.

In step S1, the process receives a video stream 101 from a video camera 100.

In step S2, the process adds a time stamp to the received video stream, the time stamp being indicative of the time of receipt of the video stream by the video management system, thus resulting in a time-stamped input video stream 311. It will be appreciated that the process may add multiple timestamps to a received video stream, e.g. so as to indicate the time of receipt of individual parts and/or GOPs thereof, e.g. individual frames of the video stream or e.g. individual GOPs. In some embodiments, time stamps are added to some but not all frames, e.g. only to an initial frame and/or to one or more otherwise selected frames. It will further be appreciated that, depending on the type of camera 100, the received video stream 101 may or may not include a timestamps. However, regardless of the presence of any time stamps in the received video stream 101, the added timestamps of the input video stream 311 and/or GOPs thereof will subsequently be used by the video management system as canonical timestamps, as will be described in greater detail below.

In step S3, the process stores the timestamped input video stream 311 and/or timestamped GOPs in a media repository 350.

In step S4, concurrently to the storage of the time-stamped input video stream, the process provides the time-stamped input video stream 311 as a live video and/or as GOPs thereof to one or more digital devices as described herein.

It will be appreciated that some embodiments of embodiments a video management system may be capable of concurrently receiving and processing multiple video streams, e.g. video streams from different video cameras, and/or GOPs thereof.

Figure 4:
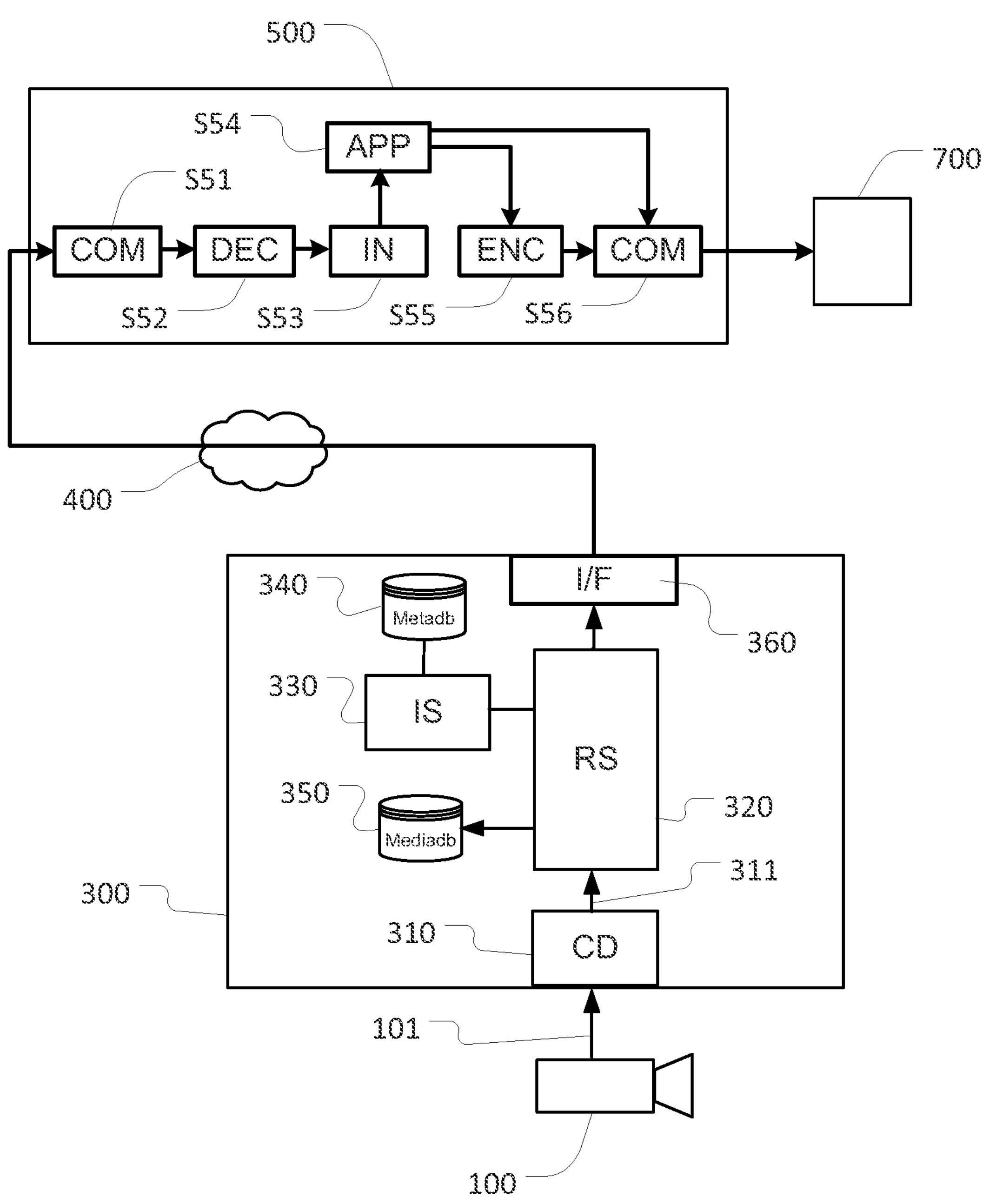
FIGS. 4-7 schematically illustrate examples of a video management and video processing process.

FIG. 4 schematically illustrate an example of a video management and video processing process performed by the video surveillance system of FIG. 1 including the digital device 500 of FIG. 2.

The camera driver 310 of the video management system 300 receives a video stream 101 from a video camera 100. The camera driver 310 adds a time stamp to the received video stream, e.g. as described in connection with step S2 of the process of FIG. 2.

The recording server 320 receives the time-stamped input video stream 311 from the camera driver and stores the time-stamped input video stream and/or time-stamped GOPs thereof in the media repository 350. Concurrently, the recording server 320 feeds the time-stamped input video stream 311 via interface 360 as a live video and/or as GOPs thereof to one or more digital devices 500.

In step S51, the communication module of the digital device receives the time-stamped video stream and/or GOPs thereof from the video management system 300 via communication network 400.

In step S52, the decoder module of the digital device 500 decodes the video stream and/or GOPs thereof.

In step S53, the digital devices provides at least a part of the decoded video stream, e.g. individual frames of the video stream, and/or GOPs thereof, to one or more application programs deployed on the digital device. It will be appreciated that, in some embodiments, the digital device may provide an encoded video stream and/or GOPs thereof to one or more of the application programs, i.e. the digital device may provide the received video stream and/or GOPs thereof without prior decoding.

In step S54 the application program processes at least the part of the video stream and/or GOPs thereof and returns a modified, i.e. processed video stream, and/or processed GOPs thereof, and/or metadata pertaining to the video stream and/or GOPs thereof.

In step S55, the encoder module of the digital device 500 encodes the processed video stream and/or GOPs thereof. Alternatively, if the application program does not return any processed video stream and/or GOPs thereof, the encoder module may re-encode the originally received video stream and/or GOPs thereof.

In step S56, the communication module sends the encoded video stream and/or GOPs thereof and/or the metadata generated by the application program to an external data processing system 700. The external data processing system may thus receive the, optionally processed, video stream and/or GOPs thereof from the digital device 500 in the same manner as it would otherwise receive a video stream from a video camera, in particular from an app-enabled camera.

It will be appreciated that some embodiments of a video management system may be capable of concurrently receiving and processing multiple video streams, e.g. video streams from different video cameras and/or video streams and/or GOPs thereof forwarded to respective digital devices.

Figure 5:
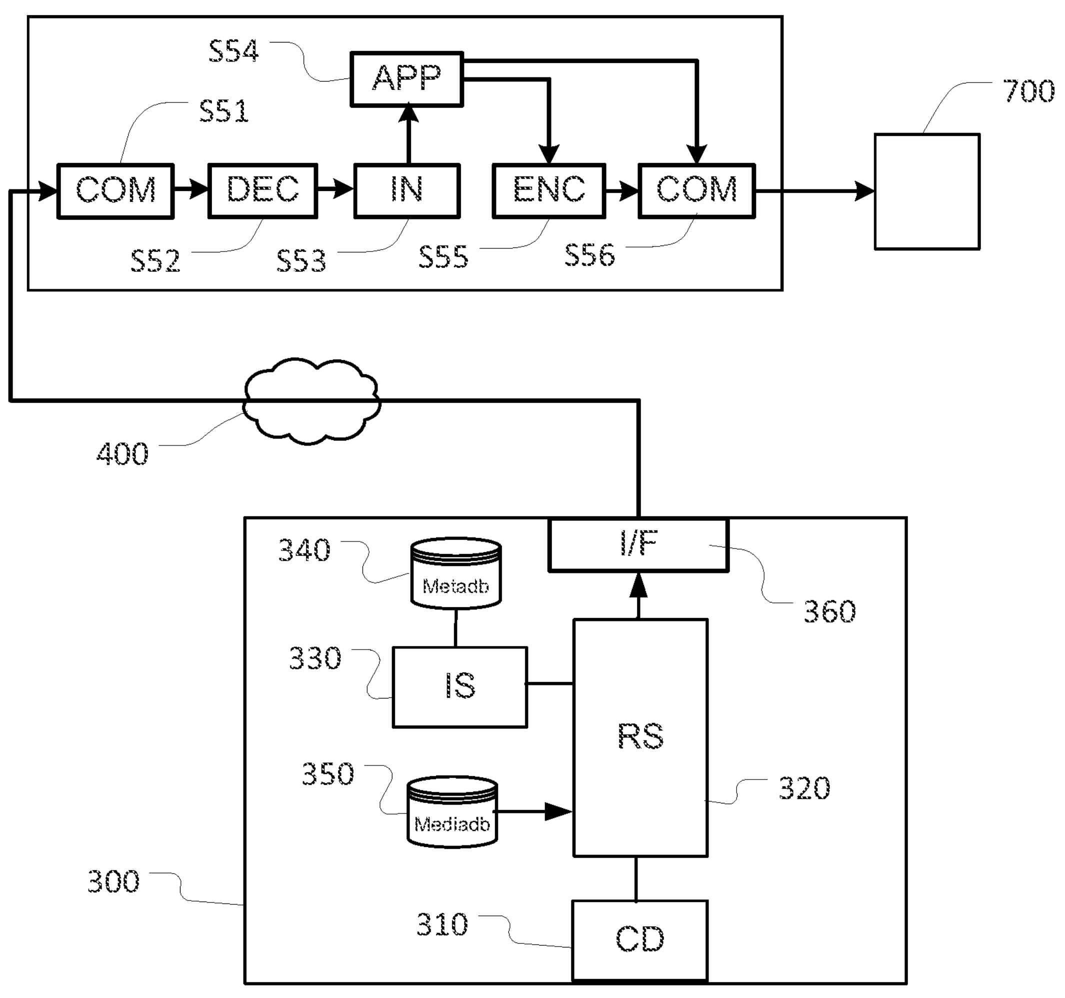

FIG. 5 schematically illustrate another example of a video management and video processing process performed by the video surveillance system of FIG. 1 including the digital device 500 of FIG. 2.

The process of FIG. 5 is similar to the process of FIG. 4, except that, in the example of FIG. 5, the video management system 300 transmits a previously stored video stream and/or GOPs thereof to the digital device instead of a live video stream that is currently received from a video camera.

To this end, the recording server 320 retrieves a previously stored video stream from the media repository 350 and forwards the retrieved video stream and/or GOPs thereof via interface 360 to the digital device 500 via the communication network 400, as was described in connection with FIG. 4.

In the present example, as the transmitted video stream and/or GOPs thereof correspond to a previously stored video stream, the video stream retrieved from the media repository 350 is date stamped according to the time of recording of the video stream. The recording server 320 may forward the retrieved video stream and/or GOPs thereof to the digital device 500 with the original canonical date stamp. Alternatively, the recording server 320 may replace the canonical date stamp with another, modified time stamp corresponding to the current time at which the recording server forwards the previously stored video stream and/or GOPs thereof. Accordingly, in the latter case, the digital device 500 receives at least one video stream and/or GOPs thereof that emulates a live video stream that is currently captured by at least one physical video camera. The digital device 500 receives, decodes and provides the at least one video stream and/or GOPs thereof to one or more application programs and forwards a re-encoded, processed video stream and/or metadata pertaining to the video stream to an external data processing system, all as described in connection with FIG. 4.

Accordingly, the video stream and/or GOPs thereof output by the digital device 500 and/or the metadata output by the digital device emulate at least one output of an app-enabled camera currently capturing a video.

Figure 6:
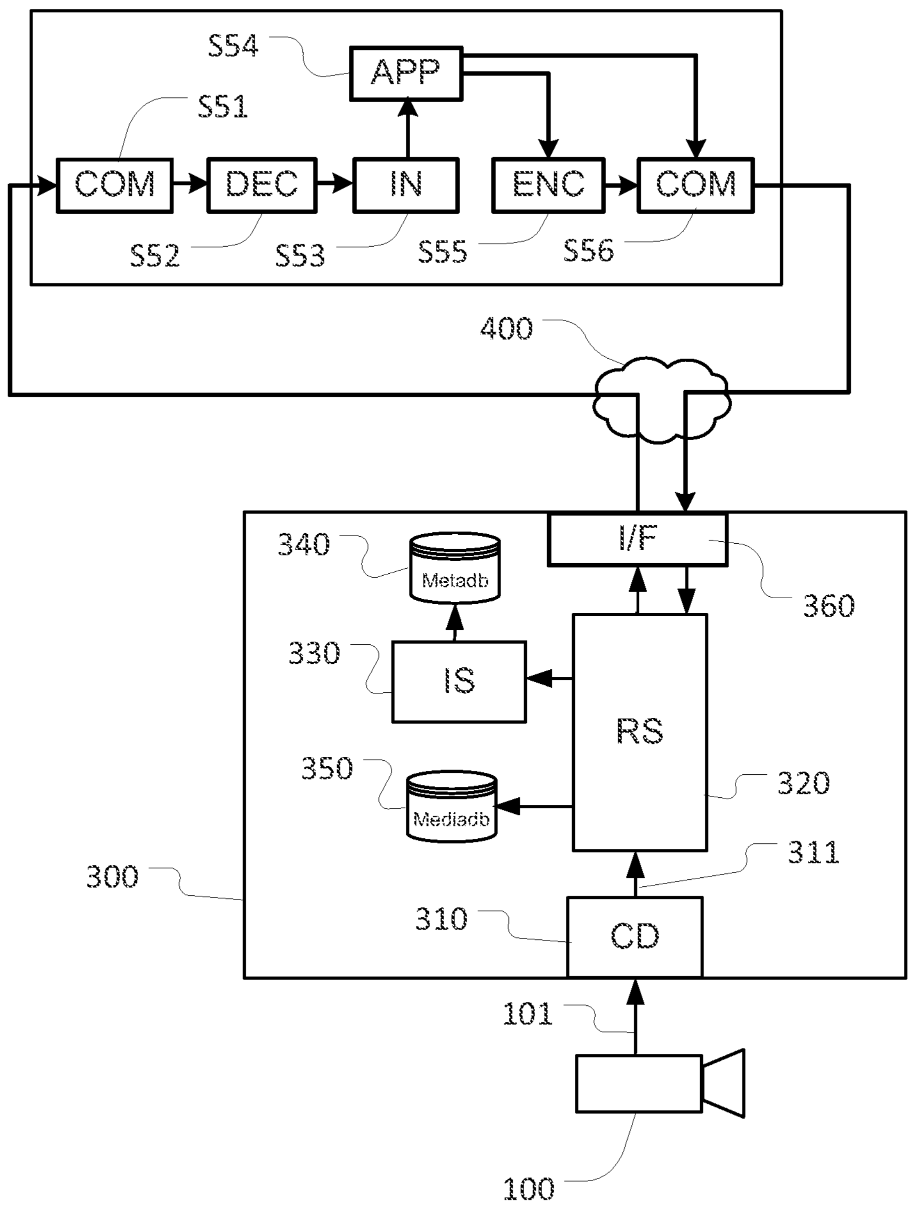

FIG. 6 schematically illustrate yet another example of a video management and video processing process performed by the video surveillance system of FIG. 1 including the digital device 500 of FIG. 2.

The process of FIG. 6 is similar to the process of FIG. 4, except that, in the example of FIG. 6, the digital device 500 returns its output to the video management system 300 instead of transmitting it to an external data processing system. It will be appreciated that, in other examples, the digital device may forward its output to an external data processing system and, concurrently, return the output to the video management system 300.

In any event, in the example of FIG. 6, the digital device 500 sends the processed video stream and/or processed GOPs thereof and/or metadata pertaining to the video stream and/or GOPs thereof via the communication network 400 back to the video management system 300. In particular, the digital device may return the processed video stream and/or GOPs thereof and/or the metadata through the same video tunnel or otherwise during the same communication session that is used for forwarding the video stream and/or GOPs thereof from the video management system 300 to the digital device 500. Accordingly, upon receipt of the processed video stream and/or processed GOPs thereof and/or the metadata, from the digital device 500, via the interface 360, the recording server 320 may associate the received processed video stream and/or processed GOPs thereof and/or the metadata to the video stream and/or GOPs thereof that has/have been fed during the same session to the digital device. Accordingly, the recording server may store the metadata and/or the processed video stream and/or processed GOPs thereof in the metadata repository 340 and/or the media repository 350, respectively, in association with the original video stream and/or GOPs thereof. In particular, the recording server may synchronize the respective data streams based on the canonical time stamps.

Figure 7:
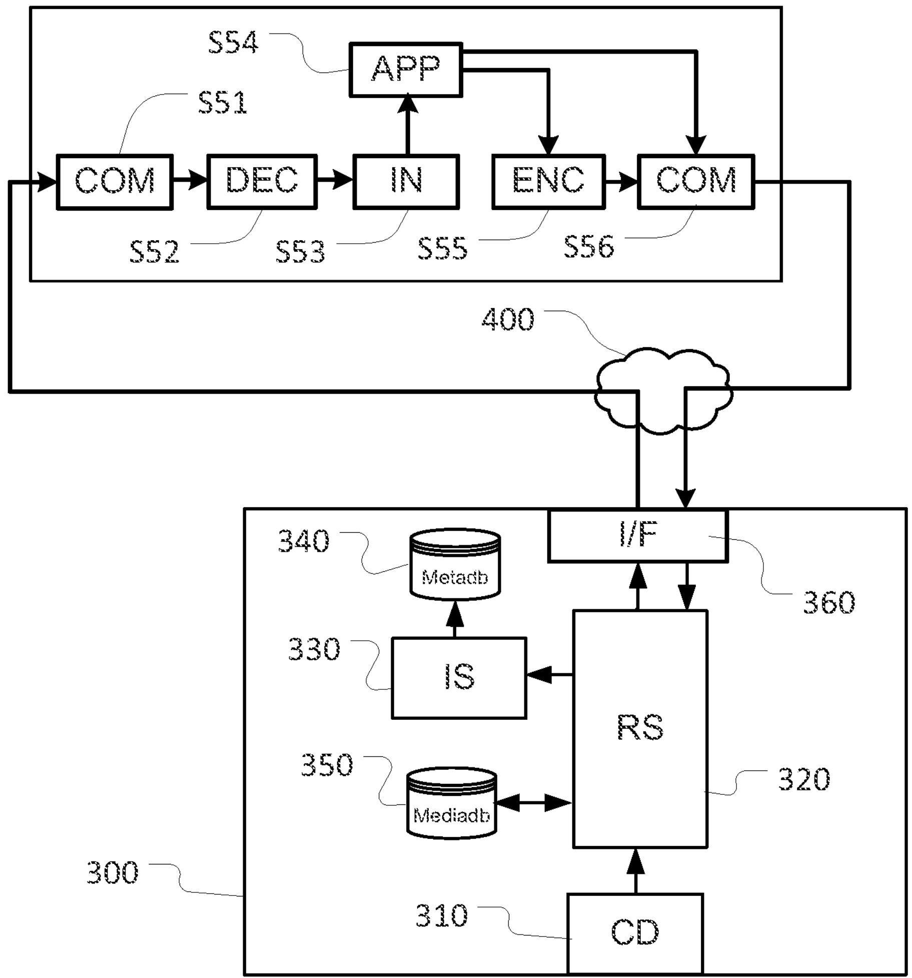

Similarly, FIG. 7 schematically illustrate yet another example of a video management and video processing process performed by the video surveillance system of FIG. 1 including the digital device 500 of FIG. 2.

The process of FIG. 7 is similar to the process of FIG. 5, except that, in the example of FIG. 7, the digital device 500 returns its output to the video management system 300 instead of transmitting it to an external data processing system. It will be appreciated that, in other examples, the digital device may forward its output to an external data processing system and, concurrently, return the output to the video management system 300.

In any event, in the example of FIG. 7, the digital device 500 sends the processed video stream and/or processed GOPs thereof and/or metadata pertaining to the video stream via the communication network 400 back to the video management system. In particular, the digital device may return the processed video stream and/or processed GOPs thereof and/or the metadata through the same video tunnel or otherwise during the same communication session that is used for forwarding the video stream and/or GOPs thereof from the video management system 300 to the digital device 500. Accordingly, upon receipt of the processed video stream and/or processed GOPs thereof and/or the metadata, from the digital device, via the interface 360, the recording server 320 may associated the received processed video stream and/or processed GOPs thereof and/or the metadata to the video stream and/or GOPs thereof that has/have been fed during the same session to the digital device. Accordingly, the recording server may store the metadata and or the processed video stream and/or processed GOPs thereof in the metadata repository 340 and/or the media repository 350, respectively, in association with the original video stream and/or GOPs thereof. In particular, the recording server may synchronize the respective data streams.

To this end, the recording server 320 retrieves a previously stored video stream and/or GOPs thereof from the media repository 350 and forwards the retrieved video via interface 360 to the digital device 500 via the communication network 400, as was described in connection with FIG. 5. In particular, the recording server may replace the canonical date stamp of the retrieved video stream and/or GOPs thereof with other, modified timestamps corresponding to the current time at which the recording server forwards the previously stored video stream and/or GOPs thereof. The recording server may maintain information about the relationship, in particular the time lag, between the canonical time stamp and the modified time stamp for use during subsequent resynchronization. Accordingly, the digital device 500 receives a video stream and/or GOPs thereof that may emulate at least one live video stream that is currently captured by a video camera. The digital device 500 receives, decodes and provides the video stream and/or GOPs thereof to one or more application programs and forwards a re-encoded, processed video stream and/or GOPs thereof and/or metadata pertaining to the video stream to an external data processing system, all as described in connection with FIG. 5.

Upon receipt of the returned processed video stream and/or processed GOPs thereof and/or the metadata from the digital device via the same video tunnel or otherwise as part of the same communication session, the recording server may re-synchronize the processed video stream and/or processed GOPs thereof and/or metadata with the canonical time stamp based on the known relation between the modified time stamp and the canonical time stamp. Accordingly, the recording server may again replace the modified time stamp with the canonical time stamp and store the processed video and/or metadata time-stamped with the canonical time stamp.

Embodiments of the method steps described herein as being carried out by a processing unit can be implemented by means of hardware comprising several distinct elements, and/or at least in part by means of a suitably programmed microprocessor. In the apparatus claims enumerating several means, several of these means can be embodied by one and the same element, component or item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, elements, steps or components but does not preclude the presence or addition of one or more other features, elements, steps, components or groups thereof.

The invention claimed is:

1. A video surveillance system comprising a video management system, one or more computer-implemented digital devices and a plurality of application programs, the system being configured to run the programs on one of or across several of the said one or more computer-implemented digital devices, wherein the video management system is configured to:

receive one or more video streams from respective one or more video cameras, store the said one or more video streams in a video repository in at least one encoded format comprising respective groups of pictures, each group of picture being assigned at least one identifier and at least one timestamp, and send to the one or more computer-implemented digital devices, via an established video tunnel, one or more groups amongst the said respective groups of pictures with a modified timestamp, wherein each of the one or more computer-implemented digital devices is configured to:

receive, via the established video tunnel, one or more of the said respective groups of pictures with the modified timestamp, process at least one received group of pictures with one or more of the said application programs, resulting in a processed group of pictures and video metadata corresponding to that received group of pictures, and output, via the established video tunnel, the said processed group of pictures with the modified timestamp and video metadata to the video management system, the video surveillance system being configured to perform parallel processing of one or more groups of pictures from one or more of the video streams with the plurality of application programs in one or across several of the said one or more computer-implemented digital devices, wherein at least one of the one or more digital devices comprises a video decoder module configured to decode at least one received group of pictures and wherein at least one of the one or more digital devices is configured to provide an application interface allowing each of the application programs to receive at least a part of the decoded video stream, the application interface selecting an application program based on the at least one of the one or more digital devices, and wherein at least one of the one or more digital devices comprises a video encoder module such as to generate the said processed group of pictures, wherein the video management system is configured to synchronize the group of pictures with the modified timestamp together with the said processed group of pictures.

2. The video surveillance system according to claim 1, wherein the video management system is configured to send at least a group of pictures, amongst the said respective groups of pictures, to several computer-implemented digital devices.

3. The video surveillance system according to claim 1, wherein the video management system is configured to send at least different groups of pictures, amongst the said respective groups of pictures, to several computer-implemented digital devices.

4. The video surveillance system according to claim 3, wherein at least some of the respective groups of pictures are part of the same received video stream received from one video camera.

5. The video surveillance system according to claim 1, wherein the application programs are different software programs.

6. The video surveillance system according to claim 1, wherein the at least one encoded format corresponds to a video coding standard chosen in the group comprising H.264, H.265, H.266, VP8, VP9 and AV1.

7. The video surveillance system according to claim 1, wherein the video management system is configured to associate the video metadata received from the computer-implemented digital devices with respective groups of pictures sent to the computer-implemented digital devices and/or with respective video streams, based on matching identifiers and/or timestamps between the received metadata and the respective groups of pictures sent to the computer-implemented digital devices and/or the respective video streams.

8. The video surveillance system according to claim 1, the system comprising a plurality of computer-implemented digital devices, wherein at least two of the computer-implemented digital devices are located on separate hardware devices.

9. The video surveillance system according to claim 1, the system comprising a plurality of computer-implemented digital devices, wherein at least two of the computer-implemented digital devices are located on the same hardware device.

10. A computer-implemented video management process for use in a video surveillance system comprising a video management system, one or more computer-implemented digital devices and a plurality of application programs, the system being configured to run the programs on one of or across several of the said one or more computer-implemented digital devices, the computer-implemented video management process comprising:

receiving one or more video streams from respective one or more video cameras, storing the said one or more video streams in a video repository in at least one encoded format comprising respective groups of pictures, each group of picture being assigned at least one identifier and at least one timestamp, and using the video management system to send to the one or more computer-implemented digital devices, via an established video tunnel, one or more groups amongst the said respective groups of pictures with a modified timestamp, the computer-implemented video management process comprising, in each of the computer-implemented digital devices:

receiving, via the established video tunnel, one or more of the said respective groups of pictures with the modified timestamp, processing at least one received group of pictures with one or more of the said application programs, resulting in a processed group of pictures and video metadata corresponding to that received group of pictures, and outputting, via the established video tunnel, the said processed group of pictures with the modified timestamp and video metadata to the video management system, the computer-implemented video management process comprising performing parallel processing of one or more groups of pictures from one or more of the video streams with the plurality of application programs in one or across several of the said one or more computer-implemented digital devices, wherein at least one of the one or more digital devices comprises a video decoder module configured to decode at least one received group of pictures and wherein at least one of the one or more digital devices is configured to provide an application interface allowing each of the application programs to receive at least a part of the decoded video stream, the application interface selecting an application program based on the at least one of the one or more digital devices, and wherein at least one of the one or more digital devices comprises a video encoder module such as to generate the said processed group of pictures, wherein the video management system is configured to synchronize the group of pictures with the modified timestamp together with the said processed group of pictures.

11. The computer-implemented video management process according to claim 10, comprising sending at least a group of pictures, amongst the said respective groups of pictures, to several computer-implemented digital devices.

12. The computer-implemented video management process according to claim 10, comprising sending at least different groups of pictures, amongst the said respective groups of pictures, to several computer-implemented digital devices.

13. The computer-implemented video management process according to claim 12, wherein at least some of the respective groups of pictures are part of the same received video stream received from one video camera.

14. The computer-implemented video management process according to claim 10, wherein the at least one encoded format corresponds to a video coding standard chosen in the group comprising H.264, H.265, H.266, VP8, VP9 and AV1.

15. The computer-implemented video management process according to claim 10, comprising using the video management system to associate the video metadata received from the computer-implemented digital devices with respective groups of pictures sent to the computer-implemented digital devices and/or with respective video streams, based on matching identifiers and/or timestamps between the received metadata and the respective groups of pictures sent to the computer-implemented digital devices and/or the respective video streams.

16. The computer-implemented video management process according to claim 10, wherein the system comprises a plurality of computer-implemented digital devices, wherein at least two of the computer-implemented digital devices are located on separate hardware devices.

17. The computer-implemented video management process according to claim 10, wherein the system comprises a plurality of computer-implemented digital devices, wherein at least two of the computer-implemented digital devices are located on the same hardware device.

18. A non-transitory computer readable storage medium storing a program for causing a computer to execute a computer-implemented video management process for use in a video surveillance system comprising a video management system, one or more computer-implemented digital devices and a plurality of application programs, the system being configured to run the programs on one of or across several of the said one or more computer-implemented digital devices, the computer-implemented video management process comprising, in the video management system:

receiving one or more video streams from respective one or more video cameras, storing the said one or more video streams in a video repository in at least one encoded format comprising respective groups of pictures, each group of picture being assigned at least one identifier and at least one timestamp, and using the video management system to send to the one or more computer-implemented digital devices, via an established video tunnel, one or more groups amongst the said respective groups of pictures with a modified timestamp, the computer-implemented video management process comprising, in each of the computer-implemented digital devices:

receiving, via the established video tunnel, one or more of the said respective groups of pictures with the modified timestamp, processing at least one received group of pictures with one or more of the said application programs, resulting in a processed group of pictures and video metadata corresponding to that received group of pictures, and outputting, via the established video tunnel, the said processed group of pictures with the modified timestamp and video metadata to the video management system, the computer-implemented video management process comprising performing parallel processing of one or more groups of pictures from one or more of the video streams with the plurality of application programs in one or across several of the said one or more computer-implemented digital devices, wherein at least one of the one or more digital devices comprises a video decoder module configured to decode at least one received group of pictures and wherein at least one of the one or more digital devices is configured to provide an application interface allowing each of the application programs to receive at least a part of the decoded video stream, the application interface selecting an application program based on the at least one of the one or more digital devices, and wherein at least one of the one or more digital devices comprises a video encoder module such as to generate the said processed group of pictures, wherein the video management system is configured to synchronize the group of pictures with the modified timestamp together with the said processed group of pictures.

* * * * *